United States Patent
Wong et al.

(10) Patent No.: US 9,507,101 B2
(45) Date of Patent: Nov. 29, 2016

(54) OPTICAL FIBER CONNECTOR WITH IMPROVED OPTICAL FIBER CABLE FIXING MECHANISM

(71) Applicant: SENKO Advanced Components (HK) Ltd., Hong Kong (HK)

(72) Inventors: Man Kit Joe Wong, Hong Kong (HK); Kim Man Wong, Hong Kong (HK)

(73) Assignee: SENKO Advanced Components (HK) Ltd., Hong Kong (HK)

( * ) Notice: Subject to any disclaimer, the term of this patent is extended or adjusted under 35 U.S.C. 154(b) by 0 days.

(21) Appl. No.: 14/612,309

(22) Filed: Feb. 3, 2015

(65) Prior Publication Data
US 2016/0223762 A1 Aug. 4, 2016

(51) Int. Cl.
*G02B 6/36* (2006.01)
*G02B 6/38* (2006.01)

(52) U.S. Cl.
CPC ........... *G02B 6/3887* (2013.01); *G02B 6/3821* (2013.01); *G02B 6/3857* (2013.01); *G02B 6/3858* (2013.01); *G02B 6/3874* (2013.01)

(58) Field of Classification Search
CPC   G02B 6/3887; G02B 6/3821; G02B 6/3874; G02B 6/3857; G02B 6/3858
USPC ............................. 385/53–56, 69–71, 86–87
See application file for complete search history.

(56) References Cited

U.S. PATENT DOCUMENTS

| | | | | |
|---|---|---|---|---|
| 5,094,552 A * | 3/1992 | Monroe | ............... | G02B 6/3887 385/76 |
| 5,719,977 A * | 2/1998 | Lampert | ............... | G02B 6/3831 385/60 |
| 5,915,056 A * | 6/1999 | Bradley | ............... | G02B 6/3887 385/76 |
| 6,234,683 B1 * | 5/2001 | Waldron | ............... | G02B 6/383 385/77 |
| 6,817,780 B2 * | 11/2004 | Ngo | ............... | G02B 6/3887 385/86 |
| 7,281,859 B2 * | 10/2007 | Mudd | ............... | G02B 6/3887 385/53 |
| 8,118,494 B2 * | 2/2012 | Larson | ............... | G02B 6/3846 385/60 |
| 8,573,859 B2 * | 11/2013 | Larson | ............... | G02B 6/3846 385/86 |
| 8,636,425 B2 * | 1/2014 | Nhep | ............... | G02B 6/381 385/78 |
| 2003/0063868 A1 * | 4/2003 | Fentress | ............... | G02B 6/3825 385/78 |
| 2006/0089049 A1 * | 4/2006 | Sedor | ............... | G02B 6/3879 439/620.21 |
| 2009/0269014 A1 * | 10/2009 | Winberg | ............... | G02B 6/3846 385/78 |
| 2011/0044588 A1 * | 2/2011 | Larson | ............... | G02B 6/3887 385/81 |
| 2012/0257858 A1 * | 10/2012 | Nhep | ............... | G02B 6/3887 385/78 |
| 2014/0133823 A1 * | 5/2014 | Simmons | ............... | G02B 6/4248 385/137 |
| 2014/0286611 A1 * | 9/2014 | Pratt | ............... | G02B 6/3887 385/78 |
| 2015/0338582 A1 * | 11/2015 | Halls | ............... | G02B 6/3846 425/510 |

* cited by examiner

*Primary Examiner* — Ryan Lepisto
*Assistant Examiner* — Guy Anderson
(74) *Attorney, Agent, or Firm* — Ella Cheong Hong Kong; Sam T. Yip (57) ABSTRACT

The present invention provides an optical fiber cable fixing mechanism and method for easy, rapid, and precise installation of an optical fiber in a field-fabricated optical fiber connector without the need for external installation equipment. The optical fiber fixing mechanism comprises a back post, a press ring, and a boot. The back post comprises at least an interior passage allowing the pass-through of the buffered section of the optical fiber cable there within; and at least one clamping latch. When the clamping latch is pressed towards the interior passage of the back post, it clamps on to the optical fiber cable laid there within. The press ring is for hooping around the back post and pressing on the clamping latch. The boot is for securing the press ring around the back post.

9 Claims, 15 Drawing Sheets

OPTICAL FIBER CONNECTOR WITH IMPROVED OPTICAL FIBER CABLE FIXING MECHANISM

TECHNICAL FIELD

The present invention generally relates to optical fiber connectors. The present invention also relates to embedded field-fabricated optical fiber connectors and through-type field-fabricated optical fiber connectors. Particularly, the present invention relates to fiber cable clamping mechanisms in optical fiber connectors.

BACKGROUND

Installing an optical fiber in an optical fiber connector is always a challenge. The precisions in the placement of the fiber cable in the connector and the securing force applied on the fiber cable are critical. Insufficient precision in either can adversely affect the transmission performance and durability of the optical fiber. For field-fabricated optical fiber connectors, the requirement of on-the-field instant installation of the optical fiber in the connector adds more challenges, such as mobility of heavy equipment, harsh environmental conditions, time constrains, and imprecision of manual work.

SUMMARY OF THE INVENTION

It is an objective of the present invention to provide an optical fiber cable fixing mechanism and method for easy, rapid, and precise installation of an optical fiber in a field-fabricated optical fiber connector without the need for external installation equipment. It is a further objective of the present invention to provide such mechanism and method that can minimize pulling stress on the optical fiber cable during the assembly and disassembly of the field-fabricated optical fiber connector with the optical fiber.

In accordance to one embodiment of the present invention, an optical fiber fixing mechanism is provided for securing an optical fiber cable inserted in an optical fiber connector, the fixing mechanism comprises a back post, a press ring, and a boot. The back post can be a separate structure or a portion of the backbone or main body of the optical fiber connector.

The back post comprises at least an interior passage allowing the pass-through of the buffered section of the optical fiber cable there within; and at least one clamping latch. Each clamping latch is positioned in an opening on the body of the back post that opens from the interior passage to the exterior of the body. A first end of the clamping latch is joined laterally to the body at one end of the opening of the back post and a second end is free suspending about the opening. The clamping latch is deformable about its first end providing elasticity to movement about its second end. The second end of the clamping latch is shaped such that it protrudes into the interior passage and also extends beyond the outer perimeter of the body of the back post. When the second end of the clamping latch is pressed towards the interior passage of the back post, it clamps on to the optical fiber cable laid there within. This secures the optical fiber cable installed within the optical fiber connector.

The press ring has an interior diameter larger than the outer perimeter of the back post such that the press ring can be slid over and encircles the back post. The interior diameter of the press ring, however, is not large enough to slide pass through the clamping latch at its uncompressed state. Thus, when the press ring is slid over and encircles the back post and pushed to rest over the clamping latch - an engaged position, the press ring presses on the clamping latch and in turn clamps the optical fiber cable laying within the interior passage of the back post.

The boot has a wide opening end and a narrow opening end. The wide opening end connects to an internal chamber and the internal chamber connects to a passage, which terminates in the narrow opening end.

To assemble the optical fiber connector, a free optical fiber cable is to be first inserted into the narrow opening end of the boot, through the press ring, then into the back post. With the press ring slid over and encircles the back post, the boot, starting from its wide opening end, is then sleeved over the back post, housing the press ring within the internal chamber of the boot. Upon catching and locking the press ring within its internal chamber, the boot is to be pushed towards the optical fiber connector main body until the boot is fully sleeved on the back post. In this position, the press ring is also moved to its engaged position, pressing on the second end of the clamping latch and in turn clamping the optical fiber cable laying within the interior passage of the back post. Finally the boot is secured over the back post by a securing means. During the assembly process, the optical fiber cable is being secured in the optical fiber connector without any pushing or pulling stress exerted on the optical fiber cable.

To disassemble, releases the securing means securing the boot over the back post, applies external compressing force on the section of the boot where the press ring is held within the boot's internal chamber, then pull the boot off away from the back post. Due to the applied external compressing force on the boot holding the press ring, the press ring is also release from its engaged position. During the disassembly process, the optical fiber cable is being released from the optical fiber connector without any pushing or pulling stress exerted on the optical fiber cable.

DESCRIPTION OF THE DRAWINGS

Embodiments of the present invention are described in more detail hereinafter with reference to the drawings, in which.

DETAILED DESCRIPTION OF THE INVENTION:

In the following description, apparatuses and methods of fixing an optical fiber cable in an optical fiber connector are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

In accordance to one embodiment of the present invention, an optical fiber cable fixing mechanism is provided for securing an optical fiber cable, such as a 900 μm buffered optical fiber cable, inserted in an optical fiber connector, the fixing mechanism comprises a back post, a press ring, and a boot.

Figure 1A:
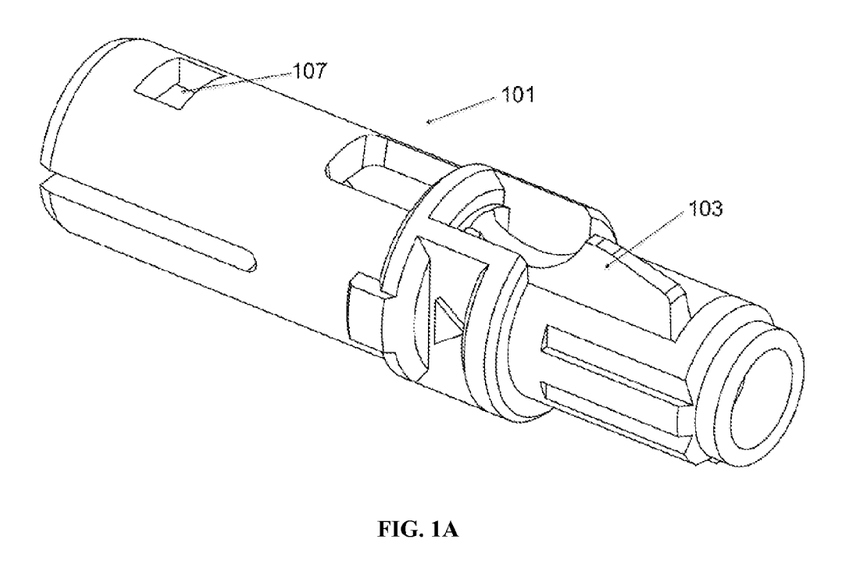
FIG. 1A shows a first view of a back post in accordance to an embodiment of the present invention.
Figure 1B:
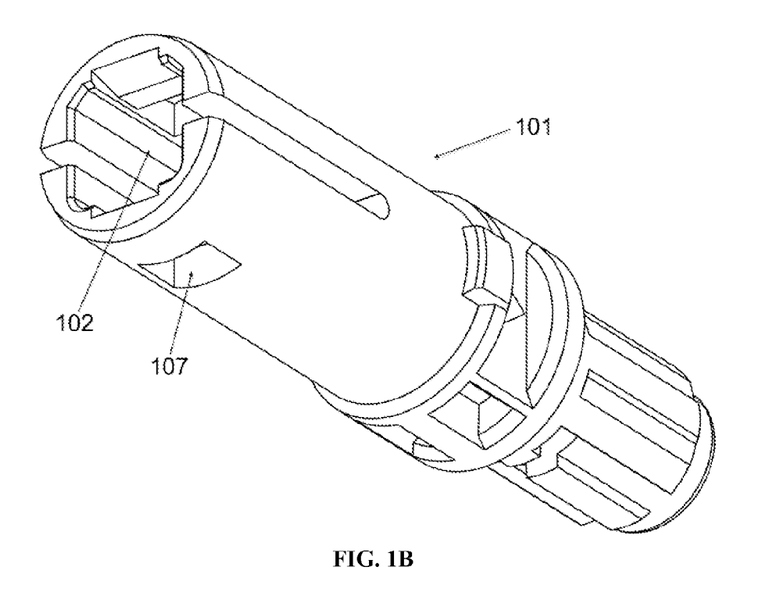
FIG. 1B shows a second view of the back post.
Figure 1C:
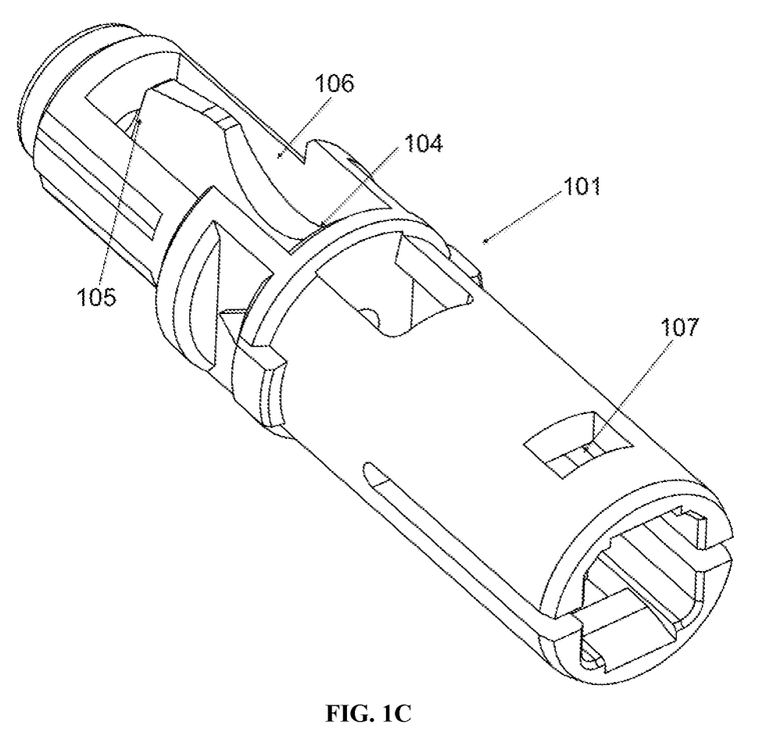
FIG. 1C shows a third view of the back post.

Referring to FIGS. 1A-1C. The back post 101 can be a separate structure or a portion of the backbone or main body of an optical fiber connector. As a separate structure, there is a channel 102 at one end of the back post 101 that is shaped to fit a connecting part of the backbone or main body of the optical fiber connector. Optionally, there can be a fastening means for attaching and locking the back post 101 to the backbone or main body of the optical fiber connector. The fastening means is shown in FIGS. 1A-1C as holes 107 for receiving the corresponding fastening latches on the backbone or main body of the optical fiber connector.

The back post 101 comprises at least an interior passage allowing the pass-through of the buffered section of the optical fiber cable there within; and at least one clamping latch 103. Each clamping latch 103 is positioned in an opening 106 on the body of the back post that opens from the interior passage to the exterior of the body. A first end 104 of the clamping latch is joined to the body at one end of the opening 106 of the back post and a second end 105 is free suspending about the opening 106. The clamping latch 103 is deformable about its first end 104 providing elasticity to movement about its second end 105. The second end 105 of the clamping latch 103 is shaped such that it protrudes into the interior passage and also extends beyond the outer perimeter of the body of the back post 101. When the second end 105 of the clamping latch 103 is pressed towards the interior passage of the back post 101, it clamps on to the optical fiber cable laid there within. This secures the optical fiber cable installed within the optical fiber connector.

Figure 2:
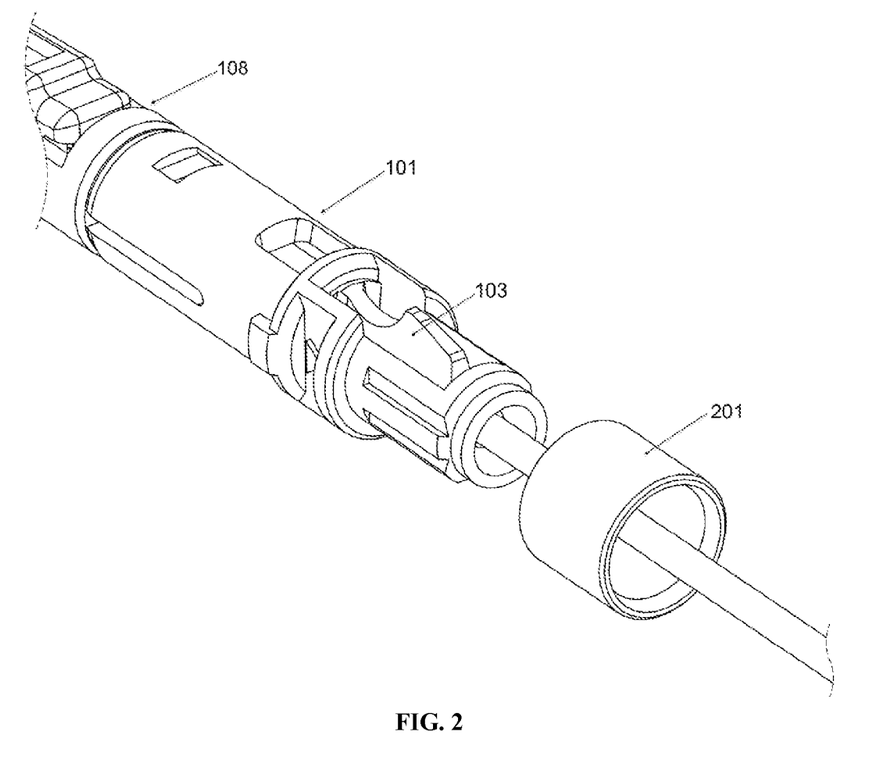
FIG. 2 shows a view of the back post and a press ring in accordance to an embodiment of the present invention.

Referring to FIG. 2. FIG. 2 shows the back post 101 as attached to the backbone or main body 108 of the optical fiber connector, and the press ring 201. The press ring 201 has an interior diameter larger than the outer perimeter of the back post 101 such that the press ring 201 can be slid over and encircles the back post 101. The interior diameter of the press ring 201, however, is not large enough to slide pass through the clamping latch 103 at its uncompressed state. Thus, when the press ring 201 is slid over and encircles the back post 101 and pushed to rest over the clamping latch 103 an engaged position, the press ring 201 presses on the clamping latch 103 and in turn clamps the optical fiber cable laying within the interior passage of the back post 101.

In accordance to a preferred embodiment, the press ring 201 is made of metal.

Figure 3A:
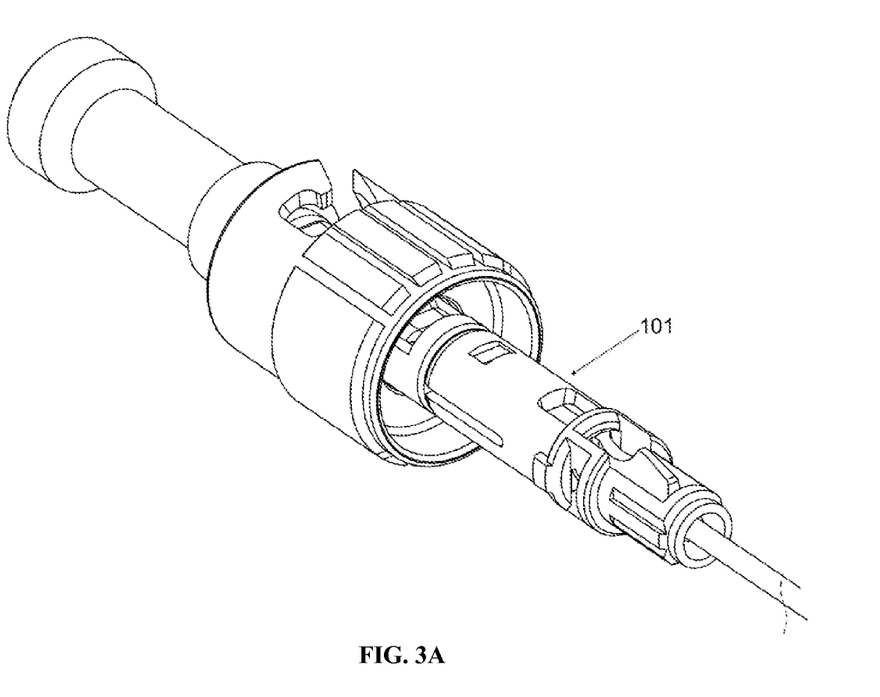
FIG. 3A shows a view of the back post attached to a optical fiber connector main body.

FIG. 3A shows the back post 101 being already attached to the backbone or main body of the optical fiber connector with an optical fiber cable that has already been inserted through the back post 101 into the backbone or main body of the optical fiber connector.

Figure 3B:
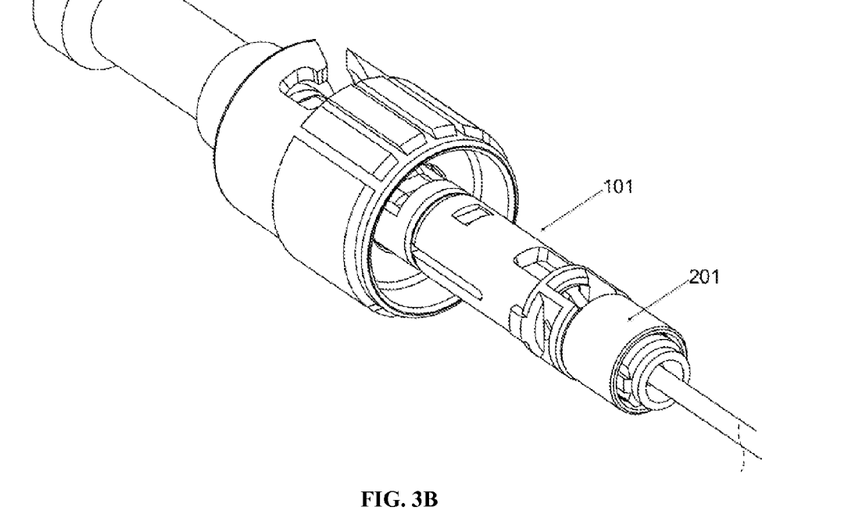
FIG. 3B shows a view of the back post attached to the optical fiber connector main body with the press ring slid over and encircles the back post and in its engaged position.

FIG. 3B shows the press ring 201 being already slid over and encircles the back post 101 and at its engaged position pressing on the clamping latch 103.

Figure 4A:
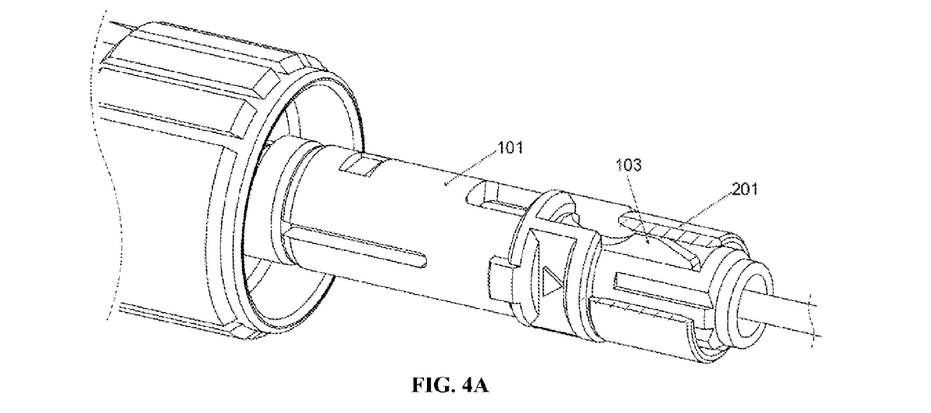
FIG. 4A shows a cross sectional view of the back post attached to the optical fiber connector main body with the press ring slid over and encircles the back post and in its engaged position.

FIG. 4A shows the cross sectional view of the press ring 201 at its engaged position pressing on the clamping latch 103.

Figure 4B:
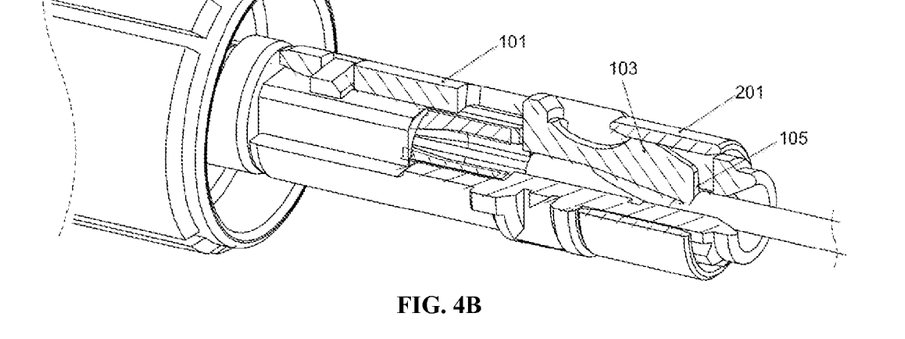
FIG. 4B shows another cross sectional view of the back post attached to the optical fiber connector main body with the press ring slid over and encircles the back post and in its engaged position.

FIG. 4B shows the cross sectional view of the press ring 201 and the back post 101 with the press ring 201 at its engaged position. It can be seen that the second end 105 of the clamping latch 103 is clamping the optical fiber cable in the interior passage of the back post 101.

Figure 5A:
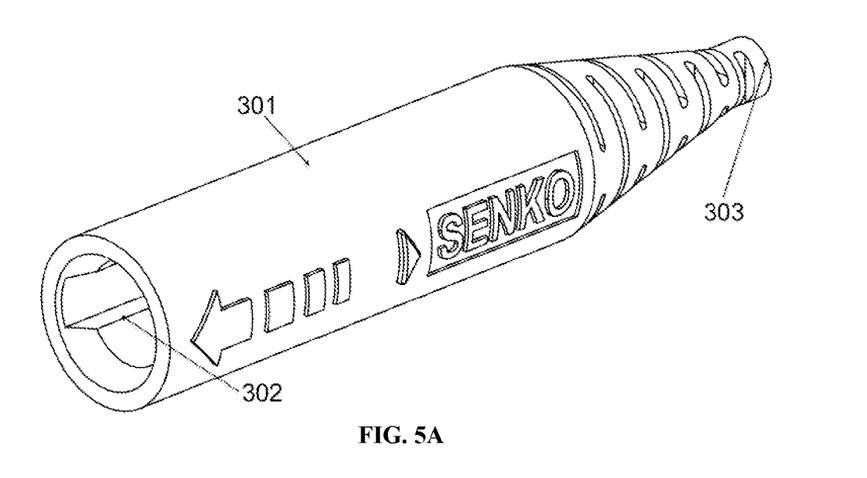
FIG. 5A shows a first view of a boot in accordance to an embodiment of the present invention.
Figure 5B:
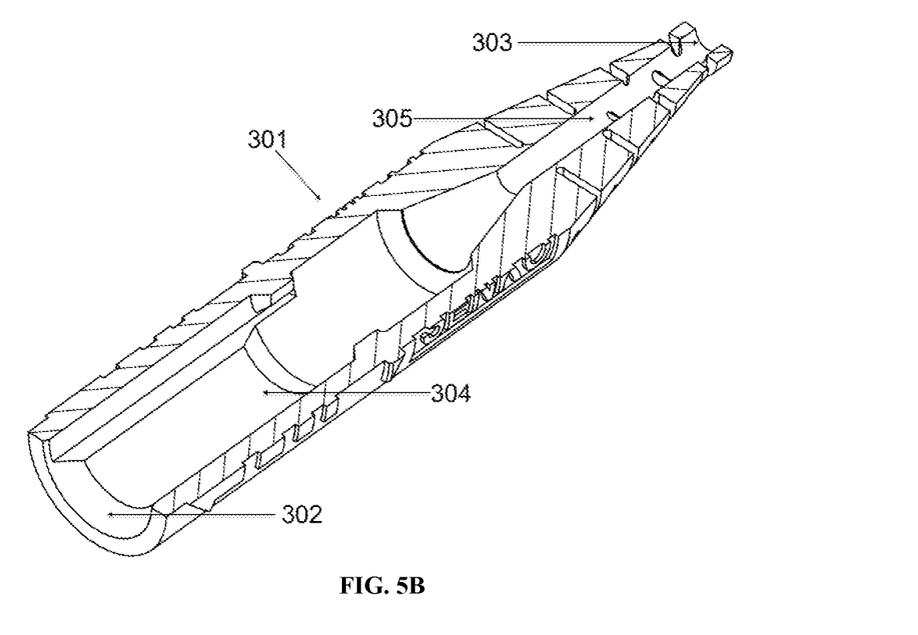
FIG. 5B shows a cross sectional view of the boot.

Referring to FIGS. 5A and 5B. The boot 301 has a wide opening end 302 and a narrow opening end 303. The wide opening end 302 extends to an internal chamber 304 and the internal chamber extends to a passage 305, which terminates in the narrow opening end 303.

Figure 6A:
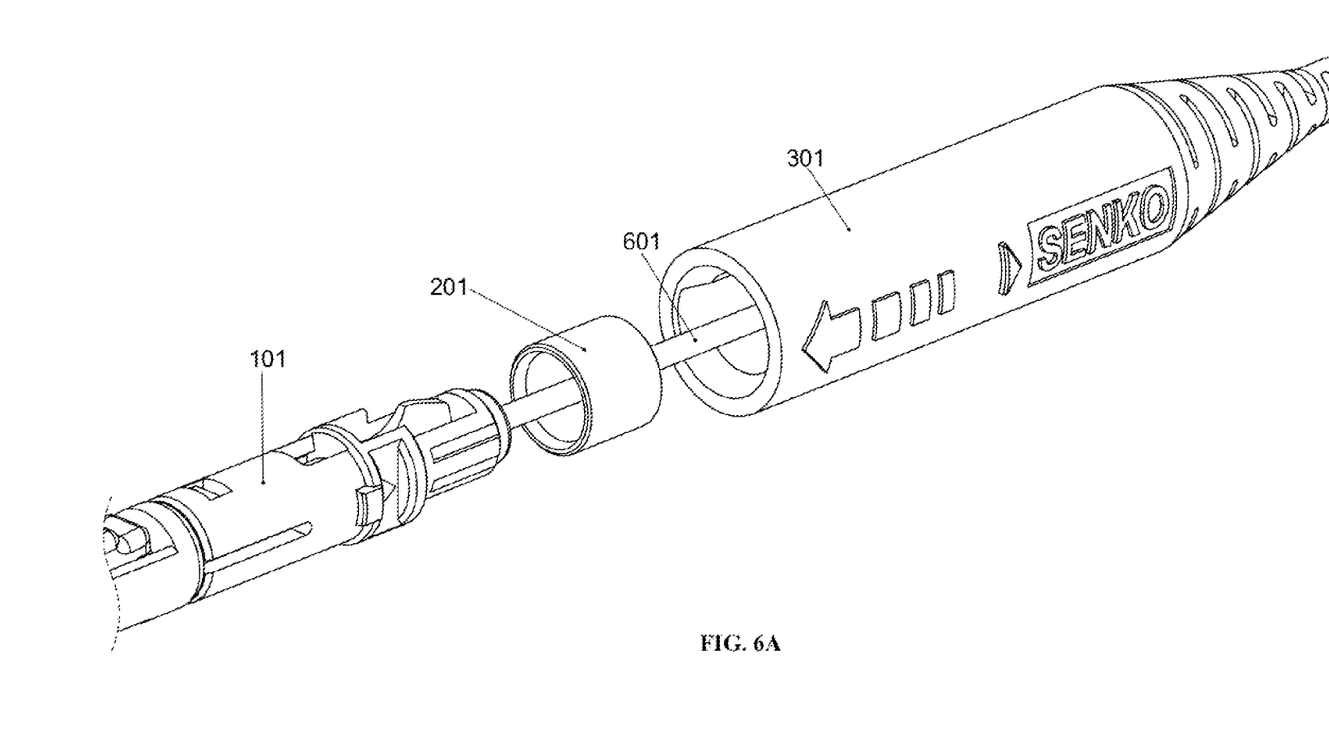
FIG. 6A demonstrates a first step of the assembly process in accordance to an embodiment of the present invention.
Figure 6B:
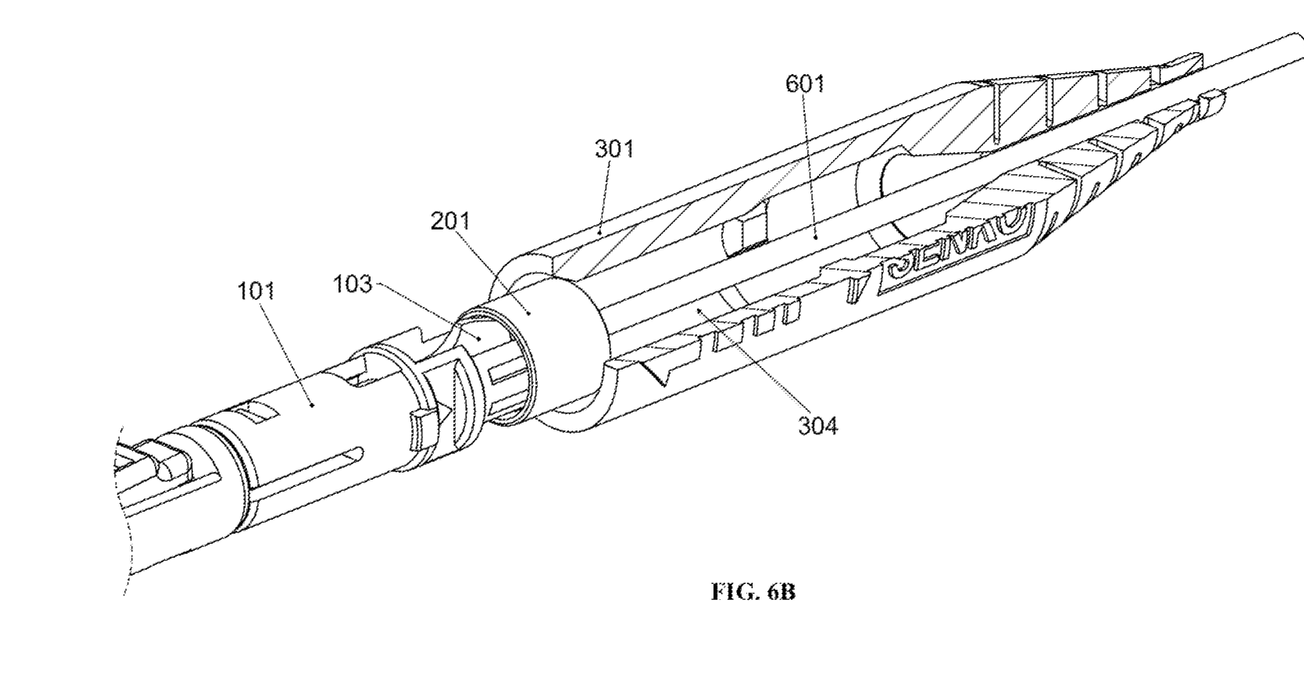
FIG. 6B demonstrates a second step of the assembly process.
Figure 6C:
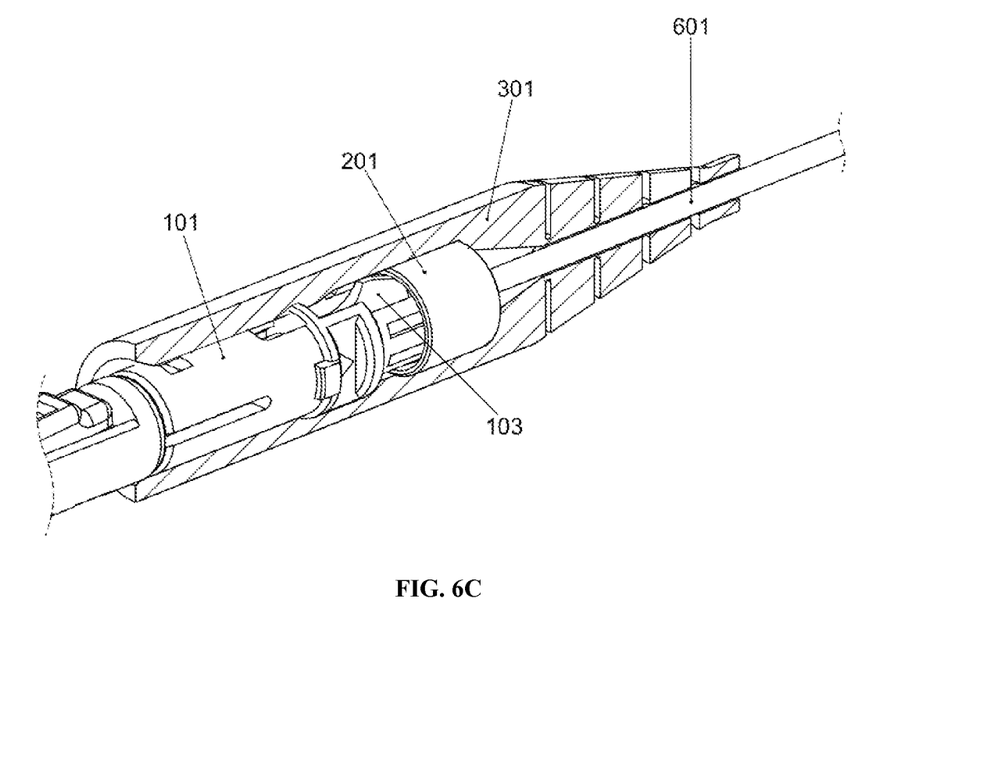
FIG. 6C demonstrates a third step of the assembly process.
Figure 6D:
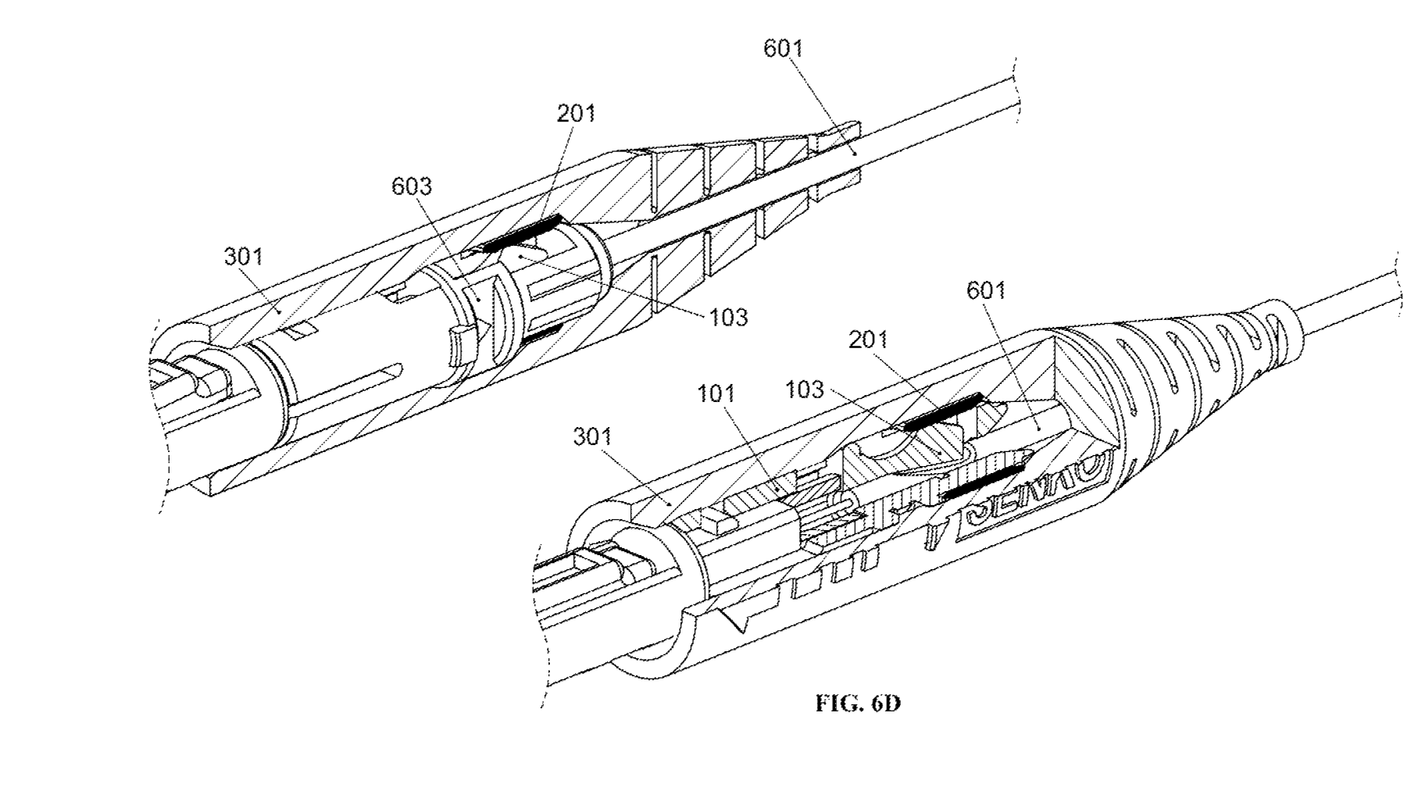
FIG. 6D demonstrates a forth step of the assembly process.
Figure 6E:
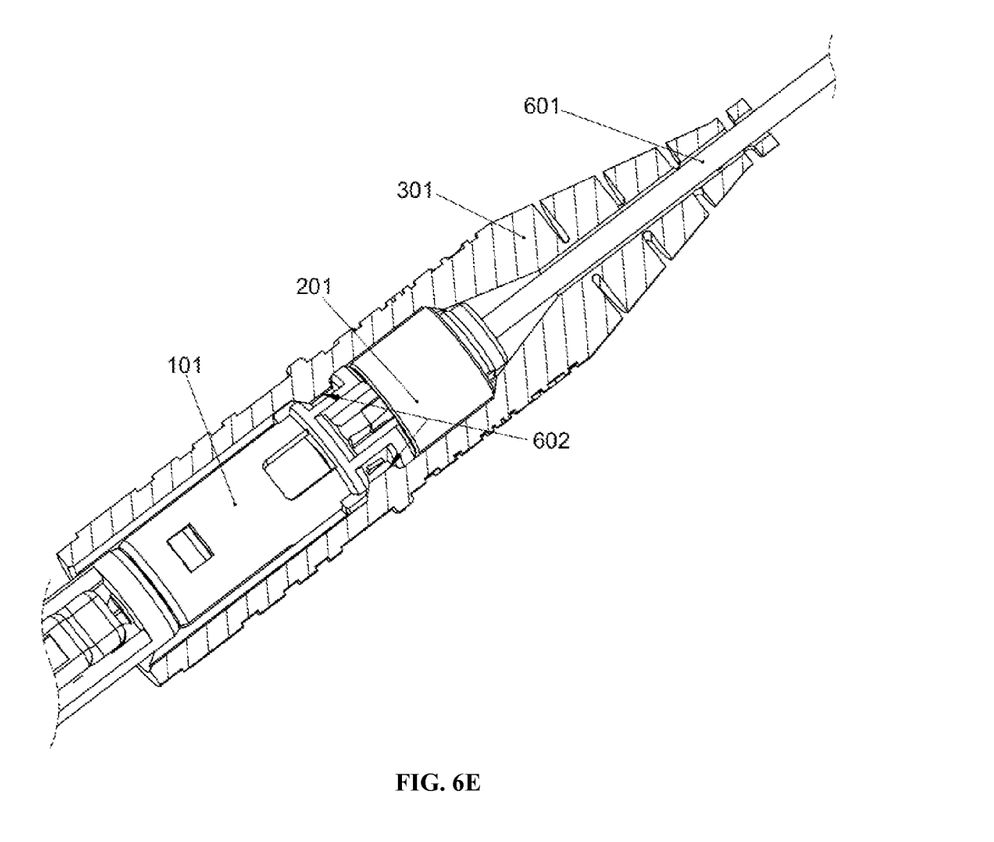
FIG. 6E demonstrates a fifth step of the assembly process.

Referring to FIGS. 6A-6E. To assemble the optical fiber connector, a free optical fiber cable 601 is to be first inserted into the narrow opening end of the boot 301, through the press ring 201, then into the back post 101 as shown in FIG. 6A. With the press ring 201 slid over and encircles the back post 101, the boot 301, starting from its wide opening end, is then sleeved over the back post 101, housing the press ring 201 within the internal chamber 304 of the boot 301 as shown in FIG. 6B. Upon catching and locking the press ring 201 within its internal chamber 304, the boot 301 is pushed towards the optical fiber connector backbone or main body as shown in FIG. 6C until the boot 301 is fully sleeved on the back post 101 as shown in FIG. 6D. In this position, the press ring 201 is also moved to its engaged position, pressing on the clamping latch 103 and in turn clamping the optical fiber cable 601 laying within the interior passage of the back post 101. As shown in FIG. 6E, the boot 301 is secured over the back post by a securing means comprising one or more protrusions 602 extending from the interior wall of the internal chamber of the boot 301, each protrusion 602 is held in one of the one or more corresponding grooves 603 (shown more clearly in FIG. 6D) on the body of the back post 101. During the assembly process, the optical fiber cable is being secured in the optical fiber connector without any pushing or pulling stress exerted on the optical fiber cable.

Figure 7A:
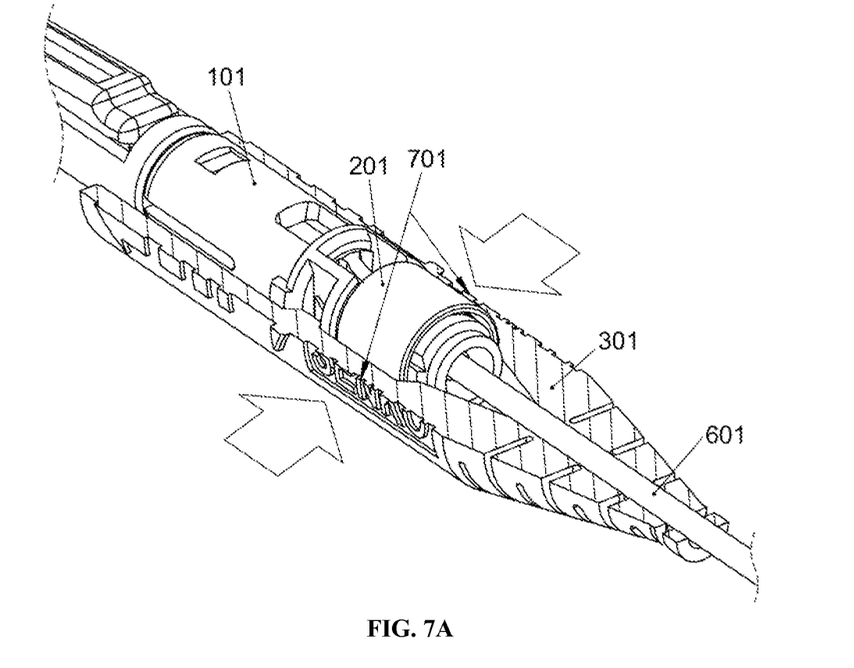
FIG. 7A demonstrates a first step of the disassembly process in accordance to an embodiment of the present invention.
Figure 7B:
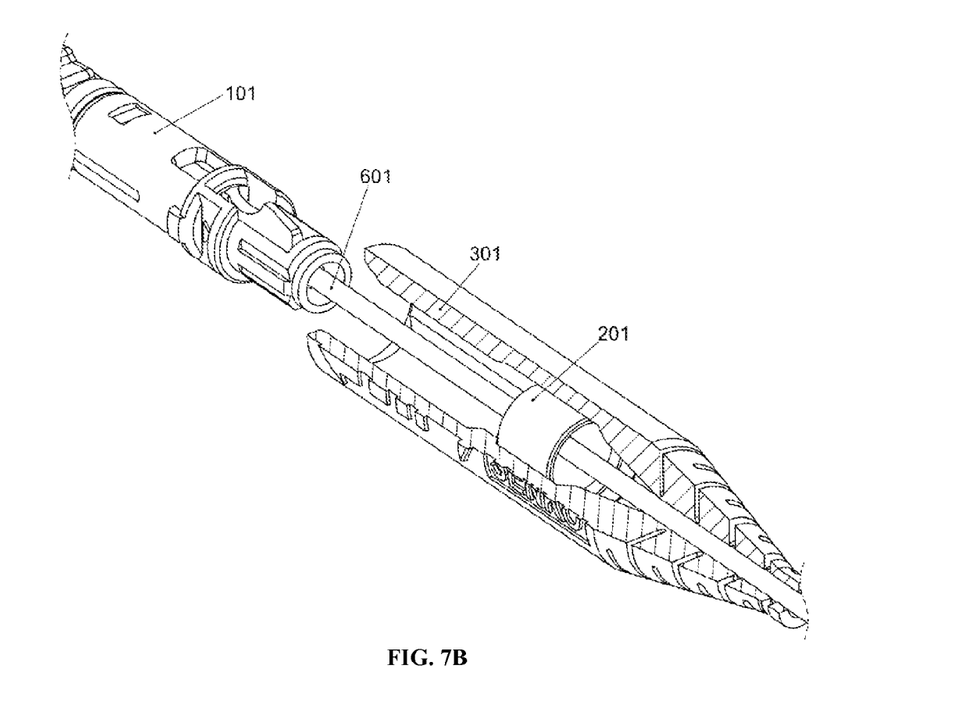
FIG. 7B demonstrates a second step of the disassembly process.

Referring to FIGS. 7A and 7B. To disassemble, first releases the securing means securing the boot 301 over the back post 101 by pulling the boot slightly away from the backbone or main body of the optical fiber connector such that the protrusions 602 are just forced out of the grooves 603. Then while applying compressing force on the section 701 of the boot 301 where the press ring 201 is held within the boot's internal chamber beneath thereof, pull the boot 301 off away from the back post 101. Due to the applied external compressing force on the boot 301 holding the press ring 201, the press ring is also release from its engaged position. During the disassembly process, the optical fiber cable is being released from the optical fiber connector without any pushing or pulling stress exerted on the optical fiber cable.

Figure 8A:
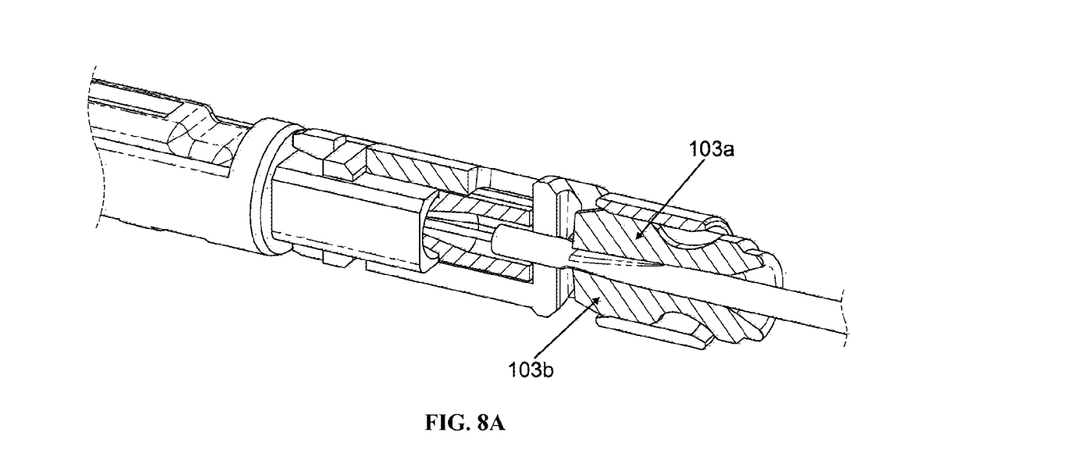
FIG. 8A shows a cross sectional view of the back post attached to the optical fiber connector main body with the press ring slid over and encircles the back post and in its engaged position in accordance to an alternative embodiment of the present invention.
Figure 8B:
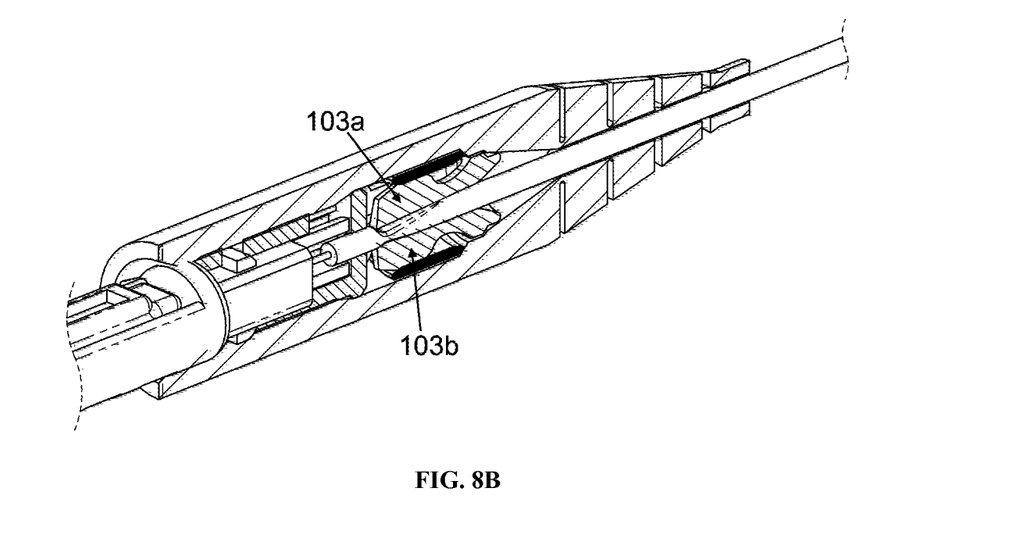
FIG. 8B shows a cross sectional view of the back post attached to the optical fiber connector main body with the press ring slid over and encircles the back post and in its engaged position with a boot sleeved over the back post in accordance to an alternative embodiment of the present invention.

Referring to FIGS. 8A and 8B. In accordance to an alternative embodiment, the back post has two clamping latches, 103a and 103b, each resides at an opposing side of the back post. The function, engaging and disengaging processes of this two-clamping-latch design are substantially the same as those of the single-clamping-latch design described above. An advantage of this two-clamping-latch design is that the clamping force exerted on the optical fiber cable when in the engaged position where the press ring is pressing on the clamping latches 103a and 103b is symmetrical coming from two opposing directions rather from only one direction.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. An optical fiber connector, comprising:
   a main body or backbone;
   a back post, comprising:
      an interior passage for allowing an optical fiber cable to pass through thereof, and
      a clamping latch for clamping the optical fiber cable inside the interior passage,
         wherein the clamping latch is positioned in an opening on the back post body that opens from the interior passage to the back post body exterior,
         wherein a first end of the clamping latch is joined to the back post body and a second end of the clamping latch is freely suspended above the opening,
         wherein the first end of the clamping latch is deformable providing elasticity to movement of the second end of the clamping latch, and
         wherein the second end of the clamping latch is shaped such that it protrudes into the interior passage and also extends beyond the back post body outer perimeter;
   a press ring for sliding over and encircling the back post and pressing on the second end of the clamping latch; and
   a boot for securing the press ring around the back post.

2. The optical fiber connector of claim 1,
   wherein the press ring, at an engaged position, is slid over and encircles the back post, and positions at the second end of the clamping latch providing a down-pressing force on the second end of the clamping latch; and
   wherein, at the engaged position, the second end of the clamping latch is pressed by the press ring at the engaged position and clamps the optical fiber cable in the interior passage of the back post.

3. The optical fiber connector of claim 1,
   wherein the boot includes a wide opening end and a narrow opening end; and
   wherein the wide opening end extends to an internal chamber and the internal chamber extends to a passage, which terminates in the narrow opening end.

4. The optical fiber connector of claim 3,
   wherein the boot, during assembly, is sleeved on the back post starting from the wide opening end, grasps the press ring in the internal chamber, and pushes the press ring to an engaged position;
   wherein the optical fiber cable passes through the passage of the boot; and
   wherein the second end of the clamping latch is pressed by the press ring at the engaged position and clamps the optical fiber cable in the interior passage of the back post.

5. The optical fiber connector of claim 3, wherein the boot, during disassembly, is pulled off from the back post, grasps the press ring in the internal chamber, and releases the press ring from an engaged position.

6. The optical fiber connector of claim 1, wherein the back post is a portion of the main body or backbone.

7. The optical fiber connector of claim 1, wherein the back post further comprises a fastening means for attaching to the main body or backbone.

8. The optical fiber connector of claim 1, wherein the press ring is made of metal.

9. The optical fiber connector of claim 1, wherein the back post further comprises:
   a second clamping latch for clamping the optical fiber cable inside the interior passage,
      wherein the second clamping latch is positioned opposite to the clamping latch, and
      wherein, at an engaged position, the clamping latch and the second clamping latch exert a symmetrical clamping force on the optical fiber cable inside the interior passage.

* * * * *